US012334098B2

(12) United States Patent
Master et al.

(10) Patent No.: US 12,334,098 B2
(45) Date of Patent: Jun. 17, 2025

(54) METHODS, APPARATUS, AND SYSTEMS FOR DETECTION AND EXTRACTION OF SPATIALLY-IDENTIFIABLE SUBBAND AUDIO SOURCES

(71) Applicants: Dolby Laboratories Licensing Corporation, San Francisco, CA (US); DOLBY INTERNATIONAL AB, Dublin (IE)

(72) Inventors: Aaron Steven Master, San Francisco, CA (US); Lie Lu, Dublin, CA (US); Harald Mundt, Fürth (DE)

(73) Assignees: Dolby Laboratories Licensing Corporation, San Francisco, CA (US); DOLBY INTERNATIONAL AB, Dublin (IE)

(*) Notice: Subject to any disclaimer, the term of this patent is extended or adjusted under 35 U.S.C. 154(b) by 234 days.

(21) Appl. No.: 18/009,501

(22) PCT Filed: Jun. 11, 2021

(86) PCT No.: PCT/US2021/036900
§ 371 (c)(1),
(2) Date: Dec. 9, 2022

(87) PCT Pub. No.: WO2021/252823
PCT Pub. Date: Dec. 16, 2021

(65) Prior Publication Data

US 2023/0245671 A1 Aug. 3, 2023

Related U.S. Application Data

(60) Provisional application No. 63/038,048, filed on Jun. 11, 2020.

(30) Foreign Application Priority Data

Jun. 11, 2020 (EP) .................................... 20179447

(51) Int. Cl.
*G10L 21/0272* (2013.01)

(52) U.S. Cl.
CPC ................................ *G10L 21/0272* (2013.01)

(58) Field of Classification Search
CPC .................................................. G10L 21/0272
See application file for complete search history.

(56) References Cited

U.S. PATENT DOCUMENTS 6,925,116 B2 8/2005 Liljeryd
7,454,333 B2 11/2008 Ramakrishnan
(Continued)

FOREIGN PATENT DOCUMENTS

EP 2327072 B1 3/2013
WO 2014047025 W 3/2014
WO 2015024940 A1 2/2015

OTHER PUBLICATIONS

Aaron Steven Master: "Stereo Music Source 1-15 Separation Via Bayesian Modeling", Jun. 1, 2006 (Jun. 1, 2006), XP055355971. Retrieved from the Internet: URL:http://citeseerx.ist.psu.edu/viewdoc/download?doi=10.1.1.81.7477&rep=repl&type=pdf [retrieved on Mar. 17, 2017].

(Continued)

*Primary Examiner* — Stella L. Woo

(57) ABSTRACT

In an embodiment, a method comprises: transforming one or more frames of a two-channel time domain audio signal into a time-frequency domain representation including a plurality of time-frequency tiles, wherein the frequency domain of the time-frequency domain representation includes a plurality of frequency bins grouped into subbands. For each time-frequency tile, the method comprises: calculating spatial parameters and a level for the time-frequency tile; modifying the spatial parameters using shift and squeeze parameters; obtaining a softmask value for each frequency bin using the modified spatial parameters, the level and (Continued)

subband information; and applying the softmask values to the time-frequency tile to generate a modified time-frequency tile of an estimated audio source. In an embodiment, a plurality of frames of the time-frequency tiles are assembled into a plurality of chunks, wherein each chunk includes a plurality of subbands, and the method described above is performed on each subband of each chunk.

19 Claims, 4 Drawing Sheets

(56) References Cited

U.S. PATENT DOCUMENTS

| | | | | |
|---|---|---|---|---|
| 9,686,624 | B2 | 6/2017 | Ward | |
| 9,747,922 | B2 | 8/2017 | Hwang | |
| 10,046,229 | B2 | 8/2018 | Tran | |
| 10,325,615 | B2 | 6/2019 | Koretzky | |
| 2007/0076902 | A1 * | 4/2007 | Master | H04S 7/00 381/94.3 |
| 2011/0235823 | A1 | 9/2011 | Betts | |
| 2015/0312663 | A1 | 10/2015 | Traa | |
| 2016/0111107 | A1 | 4/2016 | Erdogan | |
| 2017/0154636 | A1 * | 6/2017 | Geiger | G10L 21/0316 |
| 2017/0345433 | A1 * | 11/2017 | Dittmar | G10L 13/04 |
| 2018/0088899 | A1 * | 3/2018 | Gillespie | G06F 3/165 |
| 2018/0240470 | A1 * | 8/2018 | Wang | G10L 19/008 |
| 2023/0079569 | A1 * | 3/2023 | Takeda | G10L 21/028 381/56 |

OTHER PUBLICATIONS

Aarthi M. Reddy and Bhiksha Raj: "Soft Mask Methods for Single-Channel Speaker Separation". IEEE Transactions on Audio, Speech, and Language Processing, vol. 15, No. 6, Aug. 2007. Located Via:IEEE Xplore: Technical Literature Search. Download URL:http://citeseerx.ist.psu.edu/viewdoc/downloaddoi=10.1.1.453.7614&rep=rep1&type=pdf.

Faheem Khan: "Audio-Visual Speaker Separation",Located Via:ProQuest (Technology Collection Database, Dissertations and Theses Database): Technical Literature Search. Download URL:https://pdfs.semanticscholar.org/a32d/c4531c729203d0dff5c890afbde03728a665.pdf.

Francesca Bassi, Michel Kieffer, Cagatay Dikici: "Multiterminal source coding of Bernoulli-Gaussian correlated sources" Located Via:IEEE Xplore: Technical Literature Search.

O. Yilmaz et al: "Blind Separation of Speech Mixtures via Time-Frequency Masking",IEEE Transactions on Signal Processing, vol. 52, No. 7, Jul. 1, 2004 (Jul. 1, 2004), pp. 1830-1847, XP055150683, ISSN: 1053-587X, DOI: 10.1109/TSP.2004.828896.

* cited by examiner

METHODS, APPARATUS, AND SYSTEMS FOR DETECTION AND EXTRACTION OF SPATIALLY-IDENTIFIABLE SUBBAND AUDIO SOURCES

CROSS-REFERENCE TO RELATED APPLICATIONS

The present application is the U.S. national stage of International Patent Application No. PCT/US2021/036900 filed on Jun. 11, 2021, which in turn claims priority to U.S. Provisional Patent Application No. 63/038,048 filed on Jun. 11, 2020, and European Patent Application No. 20179447.6 filed on Jun. 11, 2020.

TECHNICAL FIELD

This disclosure relates generally to audio signal processing, and in particular to audio source separation techniques.

BACKGROUND

Two-channel audio mixes (e.g., stereo mixes) are created by mixing multiple audio sources together. There are several examples where it is desirable to detect and extract the individual audio sources from two-channel mixes, including but not limited to: remixing applications, where the audio sources are relocated in the two-channel mix, upmixing applications, where the audio sources are located or relocated in a surround sound mix, and audio source enhancement applications, where certain audio sources (e.g., speech/dialog) are boosted and added back to the two-channel or a surround sound mix.

SUMMARY

The details of the disclosed implementations are set forth in the accompanying drawings and the description below. Other features, objects and advantages are apparent from the description, drawings and claims.

In an embodiment, a method comprises: transforming, using one or more processors, one or more frames of a two-channel time domain audio signal into a time-frequency domain representation including a plurality of time-frequency tiles, wherein the frequency domain of the time-frequency domain representation includes a plurality of frequency bins grouped into a plurality of subbands; for each time-frequency tile: calculating, using the one or more processors, spatial parameters and a level for the time-frequency tile; modifying, using the one or more processors, the spatial parameters using shift and squeeze parameters; obtaining, using the one or more processors, a softmask value for each frequency bin using the modified spatial parameters, the level and subband information; and applying, using the one or more processors, the softmask values to the time-frequency tile to generate a modified time-frequency tile of an estimated audio source.

In an embodiment, a plurality of frames of the time-frequency tiles are assembled into a plurality of chunks, each chunk including a plurality of subbands, and the method comprises: for each subband in each chunk: calculating, using the one or more processors, spatial parameters and a level for each time-frequency tile in the chunk; modifying, using the one or more processors, the spatial parameters using shift and squeeze parameters; obtaining, using the one or more processors, a softmask value for each frequency bin using the modified spatial parameters, the level and subband information; and applying, using the one or more processors, the softmask values to the time-frequency tile to generate a modified time-frequency tile of the estimated audio source.

In an embodiment, the method further comprises transforming, using the one or more processors, the modified time-frequency tiles into a plurality of time domain audio source signals.

In an embodiment, the spatial parameters include panning and phase difference for each of the time-frequency tiles.

In an embodiment, the method comprises, for each subband, determining a statistical distribution of the panning parameters and a statistical distribution of the phase difference parameters; determining the shift parameters as the panning parameter and the phase difference parameter corresponding to a peak value of the respective statistical distributions of the panning parameters and phase difference parameters; and determining the squeeze parameters as a width around the peak value of the respective distributions of the panning parameters and phase difference parameters for capturing a predetermined amount of audio energy.

In an embodiment, the predetermined amount of audio energy is at least forty percent of the total energy in the statistical distribution of the panning parameters and at least eighty percent of the total energy in statistical distribution of the phase difference parameters.

In an embodiment, the softmask values are obtained from a lookup table or function for a spatio-level filtering (SLF) system trained for a center-panned target source.

In an embodiment, transforming one or more frames of a two-channel time domain audio signal into a frequency domain signal comprises applying a short-time frequency transform (STFT) to the two-channel time domain audio signal.

In an embodiment, multiple frequency bins are grouped into octave subbands or approximately octave subbands.

In an embodiment, the spatial parameters include panning and phase difference parameters for each of the time-frequency tiles, and calculating shift and squeeze parameters further comprises: optionally assembling consecutive frames of the time-frequency tiles into chunks, each chunk including a plurality of subbands; for each subband in each chunk: creating a smoothed level-parameter-weighted histogram on the panning parameter; creating a smoothed, level-parameter-weighted first phase difference histogram on the first phase difference parameter, wherein the first phase difference parameter has a first range; creating a smoothed, level-parameter-weighted second phase difference histogram on the second phase difference parameter, wherein the second phase difference parameter has a second range that is different than the first range; detecting a panning peak in the smoothed panning histogram; determining a panning peak width; determining a panning middle value; detecting a first phase difference peak in the smoothed, first phase difference histogram; determining a first phase difference peak width; determining a first phase difference middle value; detecting a second phase difference peak in the smoothed, second phase difference histogram; determining a second phase difference peak width; and determining a second phase difference middle value, wherein the shift parameters include the panning middle value and the first or second phase difference middle value, and the squeeze parameters include the panning peak width and the first or second phase difference peak width. The statistical distribution of the panning parameters of the embodiment mentioned above may comprise the smoothed level-parameter-weighted histogram on the panning parameter. The statistical distribution of the phase difference parameters may comprise the first phase histogram and the second phase histogram. Determining the panning parameter corresponding to the peak value of the statistical distribution of the panning parameters and the width around the peak value of the statistical distribution of the panning parameters may comprise detecting the panning peak, determining the panning peak width and determining the panning middle value. Determining the phase difference parameter corresponding to the peak value of the statistical distribution of the phase difference parameters and the width around the peak value of the statistical distribution of the phase difference parameters may comprises detecting the first and second phase difference peaks, determining the first and second phase difference peak widths, determining the first and second phase difference middle values.

In an embodiment, the method further comprises determining which of the first and second phase difference peak widths is more narrow (after adjustment), wherein the shift parameters include the panning middle value and the first or second phase difference middle value of the more narrow peak, and the squeeze parameters include the panning peak width and the first or second phase difference peak width that is more narrow. It shall be understood that "more narrow (after adjustment)" indicates that the second phase difference values shall be used only if they are significantly more narrow than the first phase difference values; this helps ensure stability of the phi values. In an embodiment, the value is twice as narrow. The term "more narrow (after adjustment)" means also that more energy is concentrated around the peak for the same amount of captured audio energy.

In an embodiment, the spatial parameters include panning and phase difference parameters for each of the time-frequency tiles, and calculating shift and squeeze parameters, further comprises: for each subband in each chunk: creating a smoothed level-parameter-weighted histogram on the panning parameter; creating a smoothed, level-parameter-weighted first phase difference histogram on the first phase difference parameter, wherein the first phase difference parameter has a first range; creating a smoothed, level-parameter-weighted second phase difference histogram on the second phase difference parameter, wherein the second phase difference parameter has a second range that is different than the first range; detecting a panning peak in the smoothed panning histogram; determining a panning peak width; determining a panning middle value; detecting a first phase difference peak in the smoothed, first phase difference histogram; determining a first phase difference peak width; determining a first phase difference middle value; detecting a second phase difference peak in the smoothed, second phase difference histogram; determining a second phase difference peak width; and determining a second phase difference middle value, wherein the shift parameters include the panning middle value and the first or second phase difference middle value, and the squeeze parameters include the panning peak width and the first or second phase difference peak width.

In an embodiment, the method further comprises determining which of the first and second phase difference peak widths is more narrow (after adjustment), wherein the shift parameters include the panning middle value and the first or second phase difference middle value of the more narrow peak, and the squeeze parameters include the panning peak width and the first or second phase difference peak width that is more narrow.

In an embodiment, the first phase difference range is from $-\pi$ to $\pi$ radians, and the second phase difference range is from 0 to $2\pi$ radians.

In an embodiment, the panning histogram and the first and second phase histograms are smoothed over time using panning and phase difference histograms created for previous and subsequent chunks, or weighted data in the previous and subsequent chunks is collected then directly used to form the histograms.

In an embodiment, the panning peak width captures at least forty percent of the total energy in the panning histogram, and the first and second phase difference peak widths each capture at least eighty percent of the total energy in their respective histograms.

In an embodiment, the shift and squeeze parameters for each subband in each chunk are converted to exist for each frame of the one or more frames.

In an embodiment, the panning shift and squeeze parameters are converted to exist for each frame using linear interpolation and the first or second phase difference shift parameter is converted to exist for each frame using a zero order hold.

In an embodiment, the method further comprises determining a single panning middle value and a single panning peak width value per unit of time for the one or more subbands in the one or more chunks.

In an embodiment, the softmask values are smoothed over time and frequency.

In an embodiment, an apparatus comprises: one or more processors and memory storing instructions that when executed by the one or more processors, cause the one or more processors to perform any of the preceding methods.

In an embodiment, a non-transitory, computer readable storage medium has stored thereon instructions, that when executed by one or more processors, cause the one or more processors to perform any of the preceding methods.

Particular embodiments disclosed herein provide one or more of the following advantages. Spatially-identifiable subband audio sources are efficiently and robustly extracted from a two-channel mix. The system is robust because it can extract any spatially-identifiable subband audio source, including audio sources that are amplitude-panned and audio sources that are not amplitude-panned, such as audio sources that are mixed or recorded with delay between the channels, audio sources mixed or recorded with reverberation and audio sources with spatial characteristics that vary from frequency subband to frequency subband. The system is also efficient, requiring almost no training data or latency.

DESCRIPTION OF DRAWINGS

In the accompanying drawings referenced below, various embodiments are illustrated in block diagrams, flow charts and other diagrams. Each block in the flowcharts or block may represent a module, a program, or a part of code, which contains one or more executable instructions for performing specified logic functions. Although these blocks are illustrated in particular sequences for performing the steps of the methods, they may not necessarily be performed strictly in accordance with the illustrated sequence. For example, they might be performed in reverse sequence or simultaneously, depending on the nature of the respective operations. It should also be noted that block diagrams and/or each block in the flowcharts and a combination of thereof may be implemented by a dedicated software-based or hardware-based system for performing specified functions/operations or by a combination of dedicated hardware and computer instructions.

The same reference symbol used in various drawings indicates like elements.

DETAILED DESCRIPTION

Figure 1:
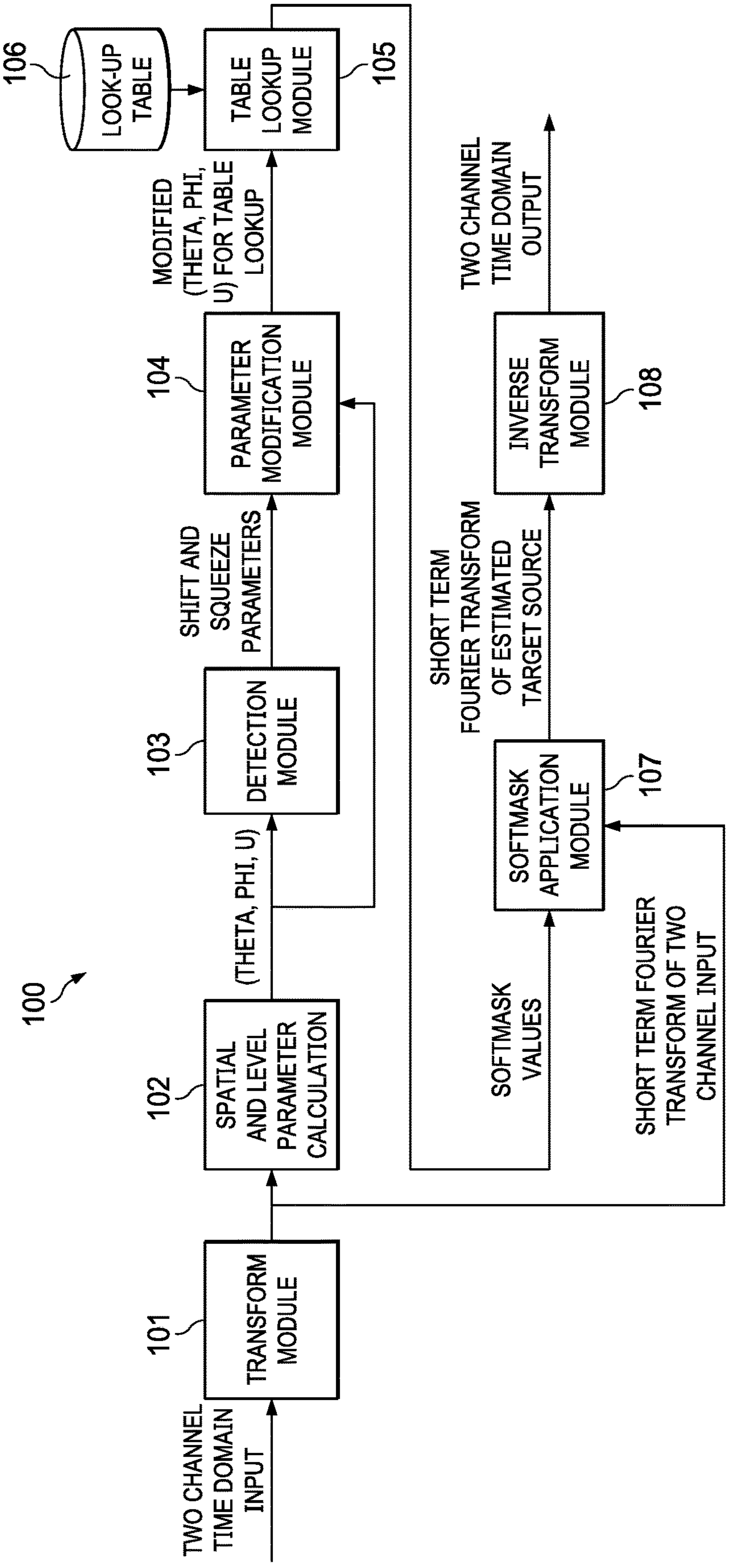
FIG. 1 is a block diagram of system for detection and extraction of spatially-identifiable subband audio sources from two-channel mixes, in accordance with an embodiment.

The disclosed embodiments allow for the detection and extraction (audio source separation) of spatially-identifiable subband audio sources from two-channel audio mixes. As used herein, "spatially-identifiable" subband audio sources are subband audio sources that have their energy concentrated in space within octave frequency subbands or approximately octave frequency subbands.

The disclosed embodiments are used primarily in the context of sound source separation systems which take two channel (stereo) signals as input, and operate in the frequency domain, such as the short-time Fourier transform (STFT) domain. There are four basic steps used in typical sound source separation systems.

First, a front end is applied that transforms the two-channel time domain audio signal into a frequency domain. In an embodiment, the STFT is commonly used which produces a spectrogram (e.g., magnitude and phase) of the input signal in the frequency domain. Elements of the STFT output may be referred to by indicating their indices in time and frequency; each such element may be called a time-frequency tile. Each time point corresponds to a frame number, which includes a plurality of frequency bins, which may be subdivided or grouped into subbands. The STFT parameters (e.g., window type, hop size) are chosen by those with ordinary skill in the art to be relatively optimal for source separation problems. From the STFT representation, the described system calculates spatial parameters theta (Θ) and phi (φ), and a level parameter U (all defined below) and makes note of the relevant quasi-octave subband b.

Second, the existence of audio sources is detected along with the parameters describing their spatial identity.

Third, the spatial parameters theta (Θ) and phi (φ), and a level parameter U are used to perform extraction of estimated audio source(s) by applying a magnitude softmask (e.g., values in the continuous range [0,1]) to each bin of the STFT representation for each channel (e.g., each bin of each time-frequency tile for left and right channels).

Fourth, the STFT domain estimate of audio source(s) is converted to a two channel time domain estimate by performing an Inverse Short Term Fourier transform (ISTFT) on each channel's STFT representation. Note that while this step is described as "fourth" in sequence in this context, there may be other optional processing that occurs in the STFT domain before this fourth step. In an embodiment, the ISTFT is performed after other STFT domain processing is complete The parameters for each bin in the STFT representation include the two spatial parameters theta (Θ) and phi (φ) and the parameter U, which are defined and calculated as follows.

Theta (Θ) is the detected panning for each time-frequency tile (ω, t), defined as:

$$\Theta(\omega, t) = \tan^{-1}\frac{|X_R(\omega, t)|}{|X_L(\omega, t)|}, \quad [1]$$

where "full left" is 0 radians and "full right" is π/2 radians and "dead center" is π/4 radians. Note that "detected panning" may also be thought of as the interchannel difference expressed as a continuous value from 0 to π/2.

Phi (φ) is the detected phase difference for each time-frequency tile, defined as $$\varphi(\omega, t) = \text{angle}\left(\frac{X_L(\omega, t)}{X_R(\omega, t)}\right), \quad [2]$$

where φ ranges from −π to π radians, with 0 meaning the detected phase is the same in both channels. For some content, there may be concentrations of φ near+/−π, which are at opposite ends of the φ range as defined here. Therefore, φ2 is defined which is the identical data as in φ, but rotated on the unit circle such that the range is from 0 to 2π. Mathematically, this just means that any values below 0 are set to their previous value plus 2π. Note that φ2 is useful in specific parts of the system.

U is the detected level for each time-frequency tile, defined as $$U(\omega,t)=10*\log_{10}(|X_R(\omega,t)|^2+|X_L(\omega,t)|^2, \quad [3]$$

which is the decibel (dB) version of the "Pythagorean" magnitude of the two channels. It may be thought of as a mono magnitude spectrogram. The version of U in Equation [3] is on a dB scale and may also be called U dB. Various scaling of U may also be used at various points in the system. For example U-power is U-power (ω,t)=(|XR(ω,t)|2+|XL(ω,t)|2). Additional versions of U may be generated by raising U to various exponents (powers). This is specifically relevant to all references herein to "level-weighted-histograms." It shall be understood that such references imply that various powers may be used when applying level-weighting; powers between 1 and 2 are recommended, and U-power (power of 2) is recommended in specific steps as noted.

Each frequency bin ω is understood to represent a particular frequency. However, data may also be grouped within subbands, which are collections of consecutive bins, where each frequency bin ω belongs to a subband. Grouping data within subbands is particularly useful for certain estimation tasks performed in the system. In an embodiment, octave subbands or approximately octave subbands are used, though other subband definitions may be used. Some examples of banding include defining band edges as follows, where values are listed in Hz:

[0,400,800,1600,3200,6400,13200,24000],

[0,375,750,1500,3000,6000,12000,24000], and

[0,375,750,1500,2625,4125,6375,10125,15375,24000].

Note that if the "octave" definition is strictly followed, there could be an infinite number of such bands with the lowest band approaching infinitesimal width, so some choice is required to allow a finite number of subbands. In an embodiment, the lowest band is selected to be equal in size to the second band, though other conventions may be used in other embodiments.

In an embodiment, the system processes groups of consecutive frames hereinafter also referred to as "chunks." This allows data from multiple frames to be used for more stable estimates of spatial attributes. By using chunks, rather than just longer frame lengths, the advantages (e.g., quasistationarity, optimality for source separation) of specific frame lengths (e.g., between 50-100 ms) are retained. Chunks may be overlapped by choosing a chunk hop size lower than the number of frames in the chunk. In an embodiment, the system uses chunks of 10 frames, with a chunk hop size of 5 frames. Because the frames will themselves be hopped at a frame hop size of 1024 samples (assuming a sample rate of 48 kHz), and be 4096 samples long, the chunks will require about 277 milliseconds of data. Depending on the computation, latency, and data stability implementation requirements, smaller or larger chunks or hop sizes could be used, with the amount of lookahead and lookback used also determined by the needs of the implementation. In an embodiment, there are 5 frames of lookahead and 5 frames of lookback for a chunk.

In an embodiment, the robust, efficient sound source separation system described herein uses a spatio-level filtering (SLF) system. A Spatio-Level Filter (SLF) is a system that has been trained to extract a target source with a given level distribution and specified spatial parameters, from a mix which includes backgrounds with a given level distribution and spatial parameters. For illustrative and practical purposes, the following description of an SLF shall assume that the target spatial parameters consist only of the panning parameter Θ1, and further assume that Θ1 corresponds to a center panned source. The techniques described herein could also be used in conjunction with an SLF trained to extract a target source whose spatial parameters are not so constrained; such a technique is described below in the context of shift and squeeze parameters.

The panning parameter Θ1 exists in the context of a signal model in which the target source, s1, and backgrounds, b, are mixed into two channels, hereinafter referred to as "left channel" (x1 or XL) and "right channel" (x2 or XR) depending on the context.

The target source, s1 is assumed to be amplitude panned using a constant power law. Since other panning laws can be converted to the constant power law, the use of a constant power law in signal model 100 is not limiting. Under constant power law panning, the source, s1, mixing to left/right (L/R) channels is described as follows:

$$x_1 = \cos(\Theta_1)s_1, \quad [1]$$

$$x_2 = \sin(\Theta_1)s_1, \quad [2]$$

where $\Theta_1$ ranges from 0 (source panned far left) to $\pi/2$ (source panned far right). We may express this in the Short Time Fourier Transform (STFT) domain as $$X_L = \cos(\Theta_1)S_1, \quad [3]$$

$$X_R = \sin(\Theta_1)S_1. \quad [4]$$

To review then, the "target source" is assumed to be panned meaning it can be characterized by Θ1. It should be clear by inspection that if a signal contains only the target source at a given point in time-frequency space, then the detected panning parameter theta (Θ) described above will yield a perfect estimate of the target source panning parameter Θ1.

Returning to the concept of how the SLF is used, recall the above definitions of Θ(ω, t), φ(ω, t) and U(ω, t) above, which may also be notated (φ,φ,U) and understood to exist for each time-frequency tile (ω, t). Theta (Θ) and phi (φ) are the "spatial parameters" detected, and U is the "level parameter" detected. Further note that the frequency value co for the tile in question is a member of a roughly-octave subband b, for which the SLF is trained. In one embodiment, for each tile (ω, t) in a time-frequency representation, the SLF takes an input of the four values (b, Θ, φ,U) and outputs a single STFT softmask value. The STFT softmask value is thus determined by any trained SLF which takes four inputs and produces one output, for each time-frequency tile. The softmask value is multiplied by the input mix representation value to produce an estimated target source value.

Note that the SLF, which takes in four inputs values and produces one output value, can exist in the form of a function (four inputs, one output) or table (four dimensional, with the values stored in the table representing the output values). In an embodiment, the SLF used takes the form of a table. Table lookup 106 is a technique used to access values in a table using any approach familiar to those skilled in the art.

Figure 2A:
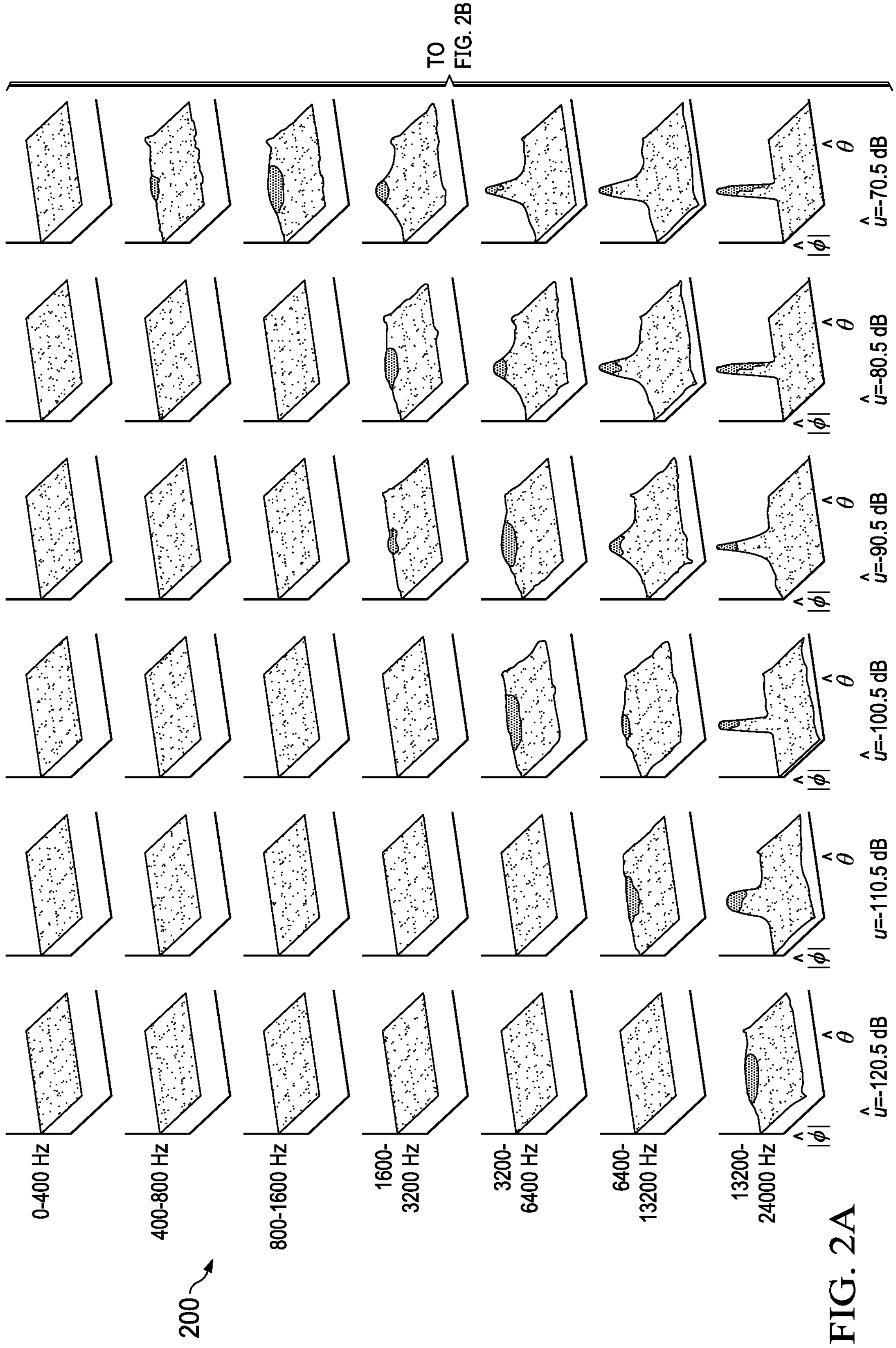
FIG. 2 is a visual depiction of the inputs and outputs of a spatio-leveling filter (SLF) trained to extract panned sources, in accordance with an embodiment.
Figure 2B:
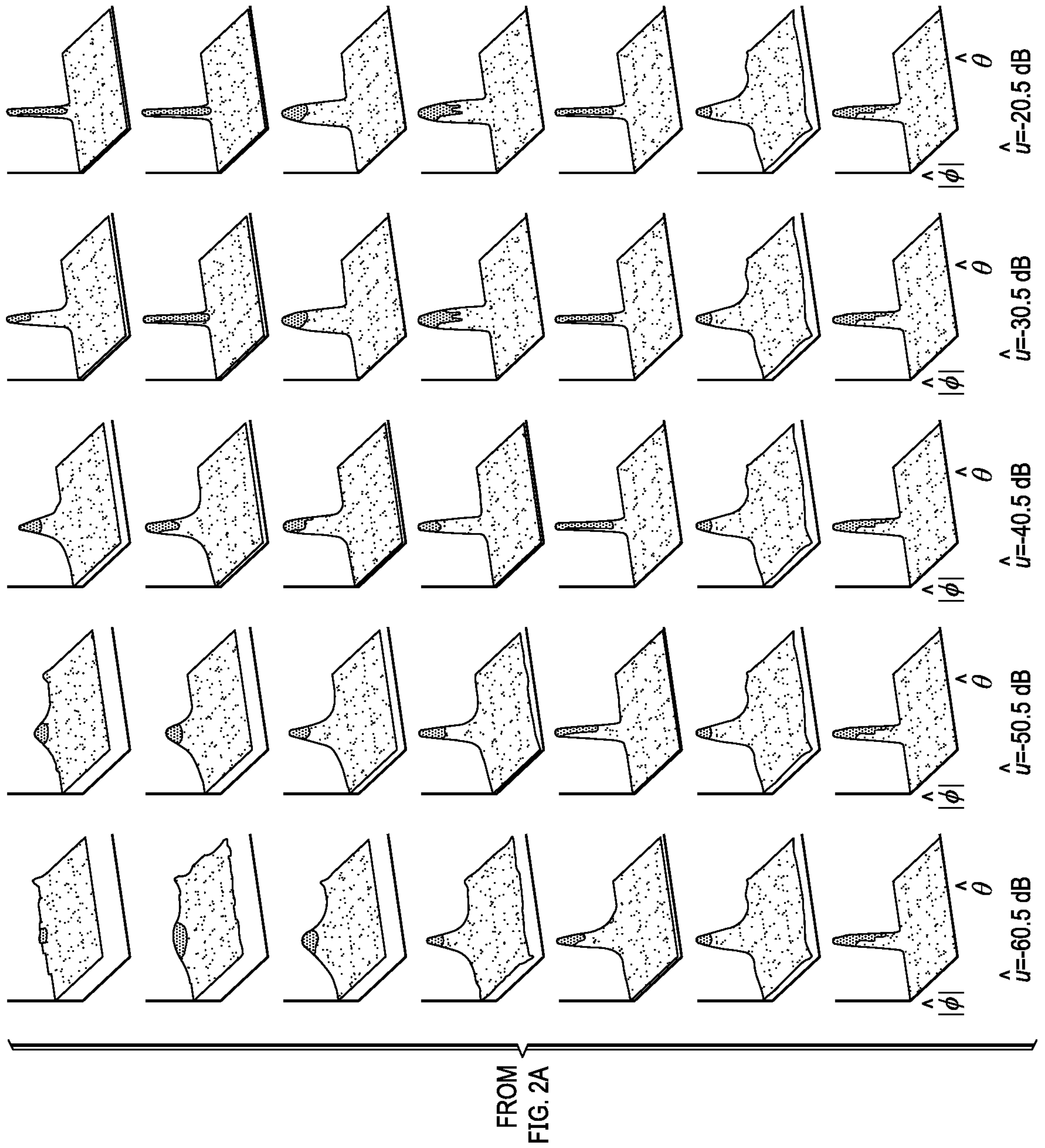

A visual depiction of the inputs and outputs of a typical trained SLF look-up table is shown in FIG. 2. This non limiting, exemplary SLF system illustrated by FIG. 2 is one example SLF system that can be used in the disclosed embodiments Other SLF systems could also be used that: 1) are trained to extract a center-panned source; 2) have at least four inputs which include: Θ, φ, U, and subband b, as defined above; 3) have at least one output which is a floating point value from 0 to 1 inclusive; 4) perform input/output operations for each STFT bin; 5) have a STFT-sized output consisting of a floating point value (referred to as a softmask) for each STFT tile; and 6) have an input STFT representation that is multiplied by the softmask value to obtain an estimated source output STFT representation, which is then transformed into a two-channel, time domain estimated source signal.

The spatial Θ and φ parameters detected for the training data will have a distribution in each subband. These values give some notion of the "spread" or "width" of such data when there is a center panned source. In an embodiment, during training a histogram analysis of the data in each subband is performed, which tracks the width to capture 40% of the energy versus Θ or 80% of the data versus φ. These widths are recorded, respectively, as the "reference thetaWidth" and "reference phiWidth" for each subband. For the example SLF system depicted in FIG. 2, the reference Θ widths (over the 7 subbands) are [0.1 0.07 0.04 0.10 0.12 0.2 0.12] and the reference φ widths are [0.6 0.5 0.4 0.6 0.8 1.0 1.0].

In an embodiment, a SLF look-up table is created by obtaining a first set of samples from a plurality of target source level and spatial distributions in frequency subbands in a frequency domain, obtaining a second set of samples from a plurality of background level and spatial distributions in frequency subbands in a frequency domain, adding the first and second sets of samples to create a combined set of samples, detecting level and spatial parameters for each sample in the combined set of samples for each subband, within subbands, weighting the detected level and spatial parameters by their respective level and spatial distributions for the target source and backgrounds; storing the weighted level, spatial parameters and signal-to-noise ratio (SNR) within subbands for each sample in the combined set of samples in a table; and re-indexing the table by the weighted level and spatial parameters and subband, such that the table includes a target percentile SNR of the weighted level and spatial parameters and subband, and that for a given input of quantized detected spatial and level parameters and subband, an estimated SNR associated with the quantized detected spatial and level parameters is obtained from the table. The SLF lookup-table may then be stored in a database for use in source separation.

The exemplary audio source separation system described herein was designed based on investigations into examples of typical mixing of audio sources, including dialog. The system exploits the information found during the investigations. This next section briefly summarizes the results of the investigations, relevant assumptions, and relevant system objectives.

- Subband spatial concentration correlates with intelligible dialog sources. When a U-power weighted 2-D histogram is plotted on the subband distribution of Θ and φ data for a chunk of frames, if there is a concentrated peak (e.g. most energy concentrated within under 10% of the (Θ, φ) space), then the bandpass signal will also be intelligible—or as intelligible as octave bandpass speech signals can be. Therefore, the system will attempt to identify, parameterize, and capture such energy.
- Octave subband accuracy can be good enough for “delayed source” identification and extraction. Inter-channel delay estimation is a considerably more challenging problem than calculating φ in the STFT domain especially when there are substantial interferers. However, for much or most typical content mixed or recorded with delay, there is still sufficient concentration versus φ within octave subbands that sources can be identified and extracted based on φ. This is a critical observation because it allows source separation without the need to explicitly estimate delay. The values of Θ and φ around which the energy is concentrated will differ versus frequency subband. Given these observations, the system will estimate φ concentrations in each subband for each unit time.
- For certain examples, it is effective and efficient to extract one source per frequency subband. In sound source separation, the task is to extract one or more sources per unit time depending on the goal or context. When the goal is to efficiently extract spatially-identifiable sources (e.g., dialog), from typical entertainment content, experiments have shown that extracting one source per approximately octave subband may be sufficient in terms of the output audio quality produced. This is because, it may be rare for two sources to be dominant in the same subband at the same time. This is a version of “W-disjoint orthogonality” which makes a similar observation for each STFT (higher frequency resolution) bin. It is emphasized that audio source separation still occurs within individual STFT bins; it is only source identification and spatial parameter estimation for which approximately octave subband processing was found to be sufficient. Based on observations, the system will attempt to parameterize only one source per subband per unit time.
- For speech sources, avoid certain frequencies when identifying spatial parameters or performing extraction. Some speech energy exists at very low frequencies, depending on the fundamental frequency of the speaker. In the best case scenario, this energy can be used to both identify spatial parameters and to perform extraction. In practice, this scenario rarely exists in typical entertainment content due to the presence of special effects and other backgrounds. For this reason, when detecting dialog, data is excluded below about 175 Hz, and when extracting dialog, extraction below about 117 Hz is not attempted. For similar reasons, and also computational cost, frequencies above approximately 13200 Hz are not considered for detection or extraction.
- Further care is required if assumptions are violated. The above observations led to the design of the sound source separation system described below, which identifies and extracts sources based on their detectable subband spatial concentration. It is assumed that the target source is at least as spatially identifiable in a subband as any interferers. This typically also requires that the target source is also at least at the same level as interferers in a subband.

FIG. 1 is a block diagram of an exemplary system 100 for detection and extraction of spatially-identifiable subband audio sources from two-channel mixes, in accordance with an embodiment. System 100 includes transform module 101, parameter extraction module 102, detection module 103, parameter modification module 104, table lookup module 105, look-up table 106, softmask application module 107 and inverse transform module 108. Each of these modules can be implemented in hardware or software or a combination of hardware or software. In an embodiment, system 100 can be implemented by the device architecture shown in reference to FIG. 4. Each module will now be described in turn with reference to FIG. 1.

Referring to the left side of FIG. 1, transform module 101 transforms a two-channel time domain mixed audio signal (e.g., a stereo signal) into a frequency domain representation, such as an STFT domain representation (e.g., a spectrogram/time-frequency tile), using windows and parameters familiar to those skilled in the art. In an embodiment, the window is a 4096 point square-root of a Hann window hopped at 1024 frames and the STFT is a 4096 point FFT for 48 kHz sampled input. Other windows can also be used, such as a Gaussian window. Within limits, scaling that preserves hop size and frame length in milliseconds can be used for lower or higher sample rates.

Extraction module 102 calculates the parameters (Θ, φ, U) described above for each time-frequency tile (bin and frame) in the STFT representation. That is, if an example has 1000 frames and uses 2049 unique STFT bins (assuming a 4096 point STFT) then there would be 2,049,000 values for each of the parameters(Θ, φ, U).

In an embodiment, the U parameter is adjusted based on a measured input data level. For each frame, a buffer of data is assembled for the current and some reasonable number of previous frames. This is intended to be a long term measurement. For practical purposes the buffer length will typically be multiple seconds (e.g., 5 seconds). For the data in the buffer, the level is calculated for the frame using the loudness, k-weighted, relative to full scale (LKFS) method. Other methods could also be used. However, whichever method is used it should match the method used to calculate the level of the training data. Note that a similar but longer-term measurement is assumed to have been previously performed on the training data to yield the measured training data level.

In an embodiment, the level parameter U is then adjusted as follows: Udb=Udb−(measured training data level−measured input data level+extra level shift), where the measured training data level is the overall value in dB of the level, such as LKFS of the training data as described above. The measured input data level is the value in dB of the level (such as in LKFS) of the input data, which is measured in real time per frame as described above.

The extra level shift is an optional user-selectable value. This value is used in a subsequent part of system 100 described below but is addressed here. By selecting a positive value, a user may specify that the input data is at a higher level than it actually is, which drives the system to use more selective values of the SLF system. The system operator may select this parameter via an interface, examples of which include parameter choice in an API call or editing the text of a configuration file.

FIG. 2, which is a sampled representation of the inputs and outputs of an SLF system, provides an example of a relevant SLF system, although any SLF system may be utilized. The diagram in FIG. 2 is a 4-dimensional diagram. The four input variables are represented by the left-right and in-out axes of each subplot and the vertical and horizontal subplot indices. Respectively, these correspond to the input variables (1) modified theta (2) modified phi (3) subband b (4) level U. Note that, for practical reasons, the horizontal subplot dimensions (level U) does not depict all levels stored in the SLF look-up table; doing so would require 128 left-right subplots as 1 dB increments are used over a range of 128 dB in the table. In practice, finer or coarser increments could be used for higher accuracy or more lookup efficiency, respectively. The output variable is represented by the vertical value of each subplot; this corresponds to a softmask value between 0 and 1.

When viewing FIG. 2, it is noted that there are many "not-displayed" subplots from left to right. Using a positive value for extra-level shift corresponds to moving from a given subplot, which corresponds to an input level, to a further-right subplot (or corresponding not-displayed data), which corresponds to a higher input level. A negative value corresponds to moving to a further-left subplot (or corresponding data). One can observe generally, that moving to a further-right subplot (or to data in the table corresponding to such a subplot, whether included in FIG. 2 or not) leads to more selective (less "flat") filtering. This is associated with less background capture, but more artifacts in the source estimate. Conversely, using lower values has opposite effects, such as more background capture but fewer artifacts.

Detection module 103 detects one spatially-identifiable audio source for each subband. The recommended method to do so involves histograms and is described in detail below. However, any method, e.g. distribution estimation from Parzen windows, which (1) estimates the peak value of the relevant distributions on theta and phi, (2) estimates the range of said distributions to capture significant energy, e.g. a predetermined amount of audio energy, vs theta and phi (recommended 40% for theta and 80% for phi), meets the design requirements for the system. Note that for dialog audio sources, which have little energy above 13 kHz, the cost of detection for the top octave may not justify its use. Therefore, this procedure may only apply to subbands whose lowest frequency is at or below 13 kHz. Detection module 103 assembles consecutive frame data into chunks (e.g. 10-frame chunks). For each subband in each chunk (if in the first subband, data below 175 Hz is excluded as suggested above), detection module 103 creates a U-power weighted histogram on Θ that is smoothed over 0. Also, the same process is applied to φ (which ranges from −π to π) and φ2 (which ranges from 0 to 2π). The U-power weighted histograms may use any number of bins (e.g., 51 bins versus Θ, 102 bins versus φ). Because lower subbands have fewer data points, they will require more smoothing. In another embodiment, fewer histogram bins may be used for lower subbands and more histogram bins may be used for higher subbands. Smoothing may be performed using techniques familiar to those experienced in the art. However, it is recommended, in a preferred embodiment, to smooth kernels are used over each of Θ and φ that correspond to the following fractional values of the range of Θ or φ data: 41%, 41%, 37%, 29%, 22%, 18% and 18%. Note that these 7 fractional values correspond to the 7 frequency subbands b, as shown in FIG. 2. In an embodiment, a smoothing technique that preserves peaks at the ends of a histogram can be used.

Assuming enough chunks have accumulated over time, a smoother is applied to smooth the histograms versus time. That is, the Θ histogram for a given chunk shall be influenced by the Θ histogram for the chunks before and or after it. Similar shall be true for histograms on φ and φ2. The weightings recommended are as follows: current chunk 1.0, previous chunk 0.4, chunk before the previous chunk 0.2, future chunk 0.1. Depending on the application, the method of smoothing may be either (1) share weighted data across time then create histograms from the smoothed data, or (2) first create histograms then share weighted histograms across time thereby smoothing the histograms. When memory and computation are limited, method (2) can be used.

Referring again to FIG. 1, detection module 103 picks and detects peak width as follows. For the Θ histogram, detect the Θ value of the peak, referred to as "thetaMiddle," and also the width around this peak necessary to capture 40% of energy in the histogram, referred to as "thetaWidth". The same process is applied for φ and φ2, recording phiMiddle, phi2Middle, phiWidth and phi2Width, but when recording the width require 80% energy capture rather than 40%. Recall that Θ theta ranges from 0 (far left) to π/2 (far right) so the largest thetaWidth value will always be less than π/2. Recall the phi ranges from −π to π radians (representing all values of phase on the unit circle) so the largest phiWidth value will always be less than 2π. Also note that 80% and 40% energy capture are suggested values, but other percentages could also be chosen.

Now that the widths for φ and φ2 are known, the final values are recorded for phiMiddle and phiWidth based on which parameter had a higher concentration in φ space as indicated by a smaller phiWidth value. However, φ2 is chosen only if the width is at least 2× smaller than that for φ. This allows the rapid alternation between φ and φ2 to be reduced when there is very widely distributed quasi-random data versus φ.

The thetaMiddle, thetaWidth, phiMiddle and phiWidth parameters are now know for each subband and chunk. (Recall that subbands and bins are different: there are only about 7 subbands, but likely 2049 unique bins. Frames and chunks are also different; there are multiple frames in each chunk.). The thetaMiddle, thetaWidth and phiWidth parameters are converted to exist per frame by using first order linear interpolation, though other techniques familiar to those skilled in the art may also be used. The phiMiddle parameter is converted to exist per frame by using a zeroth order hold, to avoid rapid phase change for cases where some chunks are close or equal to +π and some chunks are close or equal to −π. The parameters thetaMiddle and thetaWidth are hereinafter also referred to as "theta shift and squeeze" parameters, and the parameters phiMiddle and phiWidth are hereinafter also referred to as the "phi shift and squeeze" parameters. Collectively, the four parameters are hereinafter referred to as "shift and squeeze" or "S&S" parameters.

The S&S parameters can be conceptually understood to represent the difference between the detected concentrations of Θ and φ data, and what the concentrations would have been for an ideal center-panned source with limited or no backgrounds. This concept will later allow the system to use the S&S parameters to modify the detected (Θ, φ, U) data in a way that an SLF designed for a center-panned source can be used to extract a target source with arbitrary concentration in Θ and φ. Such application shall be understood to be the most optimal and recommended in most cases. However, the SLF used need not be trained only for a center-panned source, the S&S parameters need not be calculated relative to only a center-panned source, and the system need not limit itself to using only a single trained SLF model to perform target source extraction. By calculating the S&S parameters relative to the trained SLF target source parameters, arbitrary SLF models, including a greater number of models, may be used. It is for efficiency that the system uses a single, center-panned source SLF.

The above steps produce values corresponding to "middle" and "width" for each of Θ and φ within each subband. In some embodiments, it may also be desired to have a single overall "middle" value for Θ per unit time which considers data in all subbands. To obtain this, a weighted sum of most of the subband Θ histograms is computed for a given chunk before peak picking, as follows. Due to spatially ambiguous special effects at low frequencies, which may challenge detection of speech sources in particular, subband 1 is optionally ignored entirely. Subband 2 is down weighted by scaling the subband 2 histograms by a factor (e.g., 0.1). The other subband histograms are weighted equally (e.g., by scaling by 1.0 each). Note that while higher octave subbands tend to have lower energy per bin, they have more bins which offsets this effect and ensures all subbands have a perceptually relevant chance to contribute to the single Θ estimate. Once the combined Θ histogram for a given chunk is created as noted above, the histogram is smoothed versus other time chunks as described above for thetaMiddle, etc. Next, simple peak picking is performed. The peaks picked are the single Θ values per chunk. In an embodiment, linear interpolation is applied between chunks to obtain these values per frame. The single Θ value per frame obtained this way is hereinafter also called "singleTheta."

Referring again to FIG. 1, parameter modification module 104 uses the shift and squeeze (S&S) parameters to modify the parameters (Θ, φ) values input to the SLF system. The steps for this part are as follows. Process frame by frame and subband by subband. That is, the below steps assume processing within a frame and subband. As before, any subband whose frequencies are mostly or entirely outside the range considered (e.g. above 13 kHz) may optionally be skipped; of course they should be skipped if the corresponding subband was skipped for S&S parameter detection because they will have no data to act on. If not otherwise specified, data described in variables herein is specific to the frame and subband considered. For example "thetaMiddle" is understood to have values for each frame and subband, so a reference to thetaMiddle implies consideration of the current frame and subband.

As suggested above, when considering SLF system output values for the first subband, frequencies below roughly 117 Hz may be ignored (no inputs given), or equally, corresponding softmask values may be set to zero after they are calculated. Note the key differences here between bins and subbands. The "raw data" for Θ, φ and U is individual for each bin in a single subband. For example, subband 4 might contain 136 bins. All 136 bins for a particular frame have individual values of (Θ, φ, U) but would correspond to the single "subband 4" values of thetaMiddle, thetaWidth, phiMiddle, and phiWidth in that frame.

In an embodiment, the Θ values are modified according to their S&S parameters as follows.

Calculate: squeezeFactor=thetaWidth/(reference thetaWidth value corresponding to the trained SLF to be applied). If the squeezeFactor is outside the range [1.0, 1.5] it is brought back within this range. Note that higher values than 1.5 may be used to allow more diffuse sources to be more fully captured. A squeezeFactor with value of 1.5 provides a good balance for extracting spatially identifiable sources. To make the system more selective, the reference thetaWidth (and reference phiWidth) values can be scaled down by multiplying them by 0.5 or other suitable factor.

Calculate: shiftFactor=thetaMiddle(for this frame and subband)−π/4. Note that π/4 is used here because it represents a center-panned source. The trained SLF system to be used shall be for a center-panned source.

Calculate: distsFromMiddle=thetaMiddle−(raw theta data for this frame and for each bin in this subband).

Calculate: newDistsFromMiddle=distsFromMiddle/squeezeFactor.

Calculate: thetaModified=thetaMiddle+newDistsFromMiddle−shiftFactor;

If thetaModified is outside the range [0, 2*π] limit it to be in this range.

Modify the phi values according to the S&S parameters using a similar approach. Note that there will be some key differences from the theta case.

Calculate: buff2=(raw phi data for this frame and each bin in this subband)—phiMiddle This may bring some data outside the range [−π, π] so, using circular treatment of phase, bring all values back into this range. That is, add 2*π to any values below −π, and subtract 2*π from any values above π.

Calculate: squeezeFactor=phi Width/(reference phiWidth value corresponding to the SLF to be applied).

At this point, the squeezeFactor value should be limited as much as for theta above. However here, an additional reality is accounted for. Sources with "extreme" Θ values near 0 (far left) or π/2 (far right) by definition are expected to always have wide distributions on phi. Therefore, it is not optimal to apply strict limits to "squeezing" in the phi dimension when thetaMiddle takes on extreme values. To ensure sensible limits are applied, the following procedure is performed. First, calculate a "theoretical maximum phi squeeze" (tpms) based on the corresponding reference phiWidth value as follows: tpms=2*π/(reference phiWidth for this subband). This value is only relevant outside reasonably close to center Θ values, namely those outside roughly the range 0.231 to 1.3398, recalling that the entire range of Θ is 0 to π/2. For values in the central range from 0.231 to 1.3398, the regular maximum phi squeeze factor is used, which is 1.5. For values very close to 0 or π/2 (those within 5% of these values), the theoretical maximum is used. For values in the remaining ranges between those already noted, a simple linear interpolation is performed based on how far into the range the thetaMiddle value lies to obtain the maximum squeezeFactor.

Next, the previously calculated squeezeFactor is limited to the value calculated in the previous step.

Finally, phiModified=buff2/squeezeFactor is calculated. There should be no values outside the range −π to π at this point.

At this point, thetaModified, phiModified and U have been modified. Note that U has already been scaled previously to account for level differences between the detected level of the input signal and the level of the training data, as well as for any extra level shift specified by the user.

Referring again to FIG. 1, table look-up module 105 retrieves softmask values from SLF look-up table 106 and softmask application module 107 applies the softmask values to STFT time-frequency tiles. The input values thetaModified, phiModified, and U are used to obtain a softmask value from look-up table 106, for each frame and bin. Although look-up table 106 is provided as an example embodiment, the SLF itself may be implemented using a variety of means, including but not limited to a look-up table, function, nested table and/or function, neural network (s), etc., in which there are four input values and one output value. Since the SLF to be used corresponds to a center panned source, any of these methods may exploit the fact that for typical generic backgrounds in the training data, the center SLF should be symmetric about π/4. They may do this by averaging data on either side of theta==π/4 when smoothing which effectively cuts training data versus theta in half. They may also reduce effective memory required by treating as identical any values of thetaModified that are above π/4 as opposed to below it. This also increases consistency of system output.

As noted earlier, in one non-limiting example, a sampled representation of n SLF is shown in FIG. 2. The output is shown on the vertical axis of each subplot. The four input variables are the left-right (Θ) and in-out (φ) axes of each subplot, as well as the vertical (subband b) and horizontal (level U) subplot indices. The output variable is between 0 and 1 inclusive and represents the fraction of the corresponding input STFT that shall be passed to the output. Since there is one (four dimensional) input per STFT tile, there is also one output per STFT tile. The result of applying the SLF function is an STFT-sized representation consisting of values between 0 and 1, also known as a softmask. This softmask representation is called "sourceMask1."

The U values will be needed in subsequent steps. Therefore, return the U values to their unscaled original values (not needed for SLF input) previously described.

In an embodiment, the softmask values and or signal values are smoothed over time and frequency using techniques familiar to those skilled in the art. Assuming a 4096 point FFT, a smoothing versus frequency can be used that uses the smoother [0.17 0.33 1.0 0.33 0.17]/sum([0.17 0.33 1.0 0.33 0.17]). For higher or lower FFT sizes some reasonable scaling of the smoothing range and coefficients should be performed. Assuming 1024 sample hop size, a smoother versus time of approximately [0.1 0.55 1.0 0.55 0.1]/sum([0.1 0.55 1.0 0.55 0.1]) can be used If hops size or frame length is changed, the smoothing should be appropriately adjusted.

Referring again to FIG. 1, inverse transform module 108 performs an inverse STFT performed on the STFT representation of estimated audio sources. In an embodiment, the same synthesis window (postwindow) as the analysis window is used to perform the inverse STFT, such as the square-root of a Hann window. Because there are two STFT representations, there are now two time-domain signals.

The output of inverse transform module 108 is a two-channel time domain audio signal that combines the audio source(s) extracted from the six (or seven) of seven subbands. In some examples, this is all that is required, and the single time domain signal may be subsequently processed or exploited. In other examples, it may be desired to have each subband signal separately. This is especially relevant when the subband signals may have very different theta and or phi values from one another. For example, if subbands 1-4 have a far-left theta source, while subbands 5 and 6 have a center right source, the system can be configured to produce bandpass outputs, either by processing in the STFT domain before inverse transform module 108, or by bandpass filtering the estimated extracted audio source signals.

FIG. 2 is a visual depiction of the inputs and outputs of an SLF system trained to extract panned sources, in accordance with an embodiment. More particularly, FIG. 2 is an example of the trained SLF look-up table described in FIG. 1.

Figure 3:
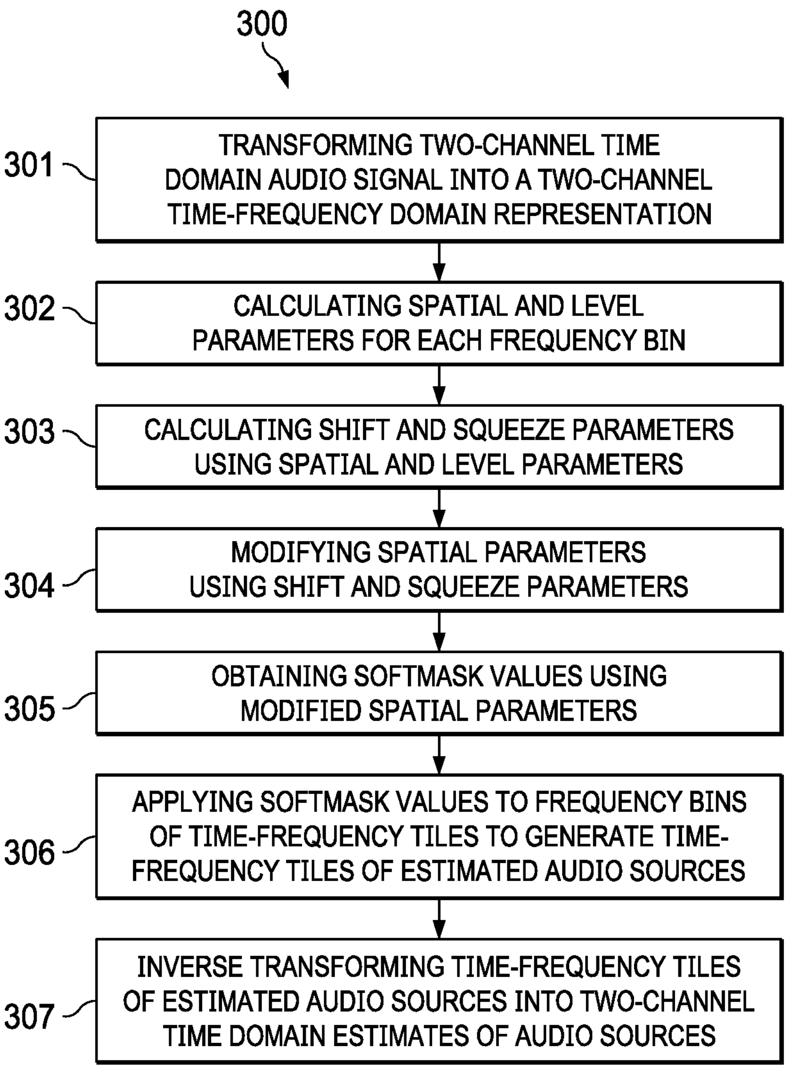
FIG. 3 is a flow diagram of a process of detection and extraction of spatially-identifiable subband audio sources from two-channel mixes, according to an embodiment.

FIG. 3 is a flow diagram of a process 300 of detection and extraction of spatially-identifiable subband audio sources from two-channel mixes, according to an embodiment. Process 300 can be implemented on, for example, device architecture 400 described in reference to FIG. 4.

Process 300 can begin by transforming a two-channel time domain audio signal (e.g., a stereo signal) into a frequency domain representation that includes time-frequency tiles having a plurality of frequency bins (301). For example, a stereo audio signal can be transformed into an STFT representation of time-frequency tiles, as described in reference to FIG. 1.

Process 300 continues by calculating spatial and level parameters for each time-frequency tile (302). For example, process 300 calculates the Θ, φ and U parameters for each time-frequency tile, as described in reference to FIG. 1.

Process 300 continues by calculating shift and squeeze parameters using the spatial and level parameters (Θ, φ and U) (303), and modifying the spatial parameters (Θ, φ) using the shift and squeeze parameters (304). For example, the shift and squeeze parameters can be calculated as described in reference to FIG. 1.

Process 300 continues by obtaining softmask values using the modified spatial parameters (Θ, φ) (305). For example, the modified spatial parameters (Θ, φ) can be used to select softmask values from a trained SLF lookup table, such as the example SLF look-up table shown in FIG. 2.

Process 300 continues by applying the softmask values to the time-frequency tiles to generate time-frequency tiles of estimated audio sources (306). For example, the softmask values are continuous values between 0 and 1 (fractions) that are multiplied with their dimensionally corresponding magnitudes in the bins of the STFT tiles. Because the softmask values are fractions, the applying of the softmask values to the STFT bins will effectively reduce the magnitudes in all the frequency bins that do not contain audio source data.

Process 300 continues by inverse transforming the time-frequency tiles of the estimated audio sources into two-channel, time domain estimates of audio sources (307).

Figure 4:
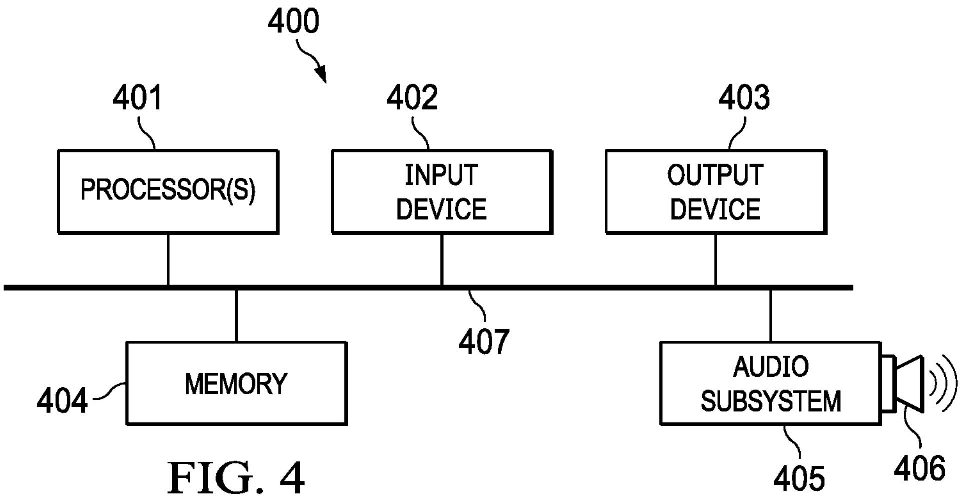
FIG. 4 is a block diagram of a device architecture for implementing the systems and processes described in reference to FIGS. 1-3, according to an embodiment.

FIG. 4 is a block diagram of a device architecture 400 for the system 100 shown in FIG. 1, according to an embodiment. Device architecture 400 can be used in any computer or electronic device that is capable of performing the mathematical calculations described above. The features and processes described herein can be implemented in one or more of an encoder, decoder or intermediate device. The features and processes can be implemented in hardware or software or a combination of hardware and software.

In the example shown, device architecture 400 includes one or more processors (401) (e.g., CPUs, DSP chips, ASICs), one or more input devices (402) (e.g., keyboard, mouse, touch surface), one or more output devices (e.g., an LED/LCD display), memory 404 (e.g., RAM, ROM, Flash) and audio subsystem 406 (e.g., media player, audio amplifier and supporting circuitry) coupled to loudspeaker 406. Each of these components are coupled to one or more busses 407 (e.g., system, power, peripheral, etc.). In an embodiment, the features and processes described herein can be implemented as software instructions stored in memory 404, or any other computer-readable medium, and executed by one or more processors 401. Other architectures are also possible with more or fewer components, such as architectures that use a mix of software and hardware to implement the features and processes described here.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Various aspects of the present invention may be appreciated from the following enumerated example embodiments (EEEs):

EEE1. A method comprising:
- transforming, using one or more processors, one or more frames of a two-channel time domain audio signal into a time-frequency domain representation including a plurality of time-frequency tiles, wherein the frequency domain of the time-frequency domain representation includes a plurality of frequency bins grouped into a plurality of subbands;
- for each time-frequency tile:
- calculating, using the one or more processors, spatial parameters and a level for the time-frequency tile;
- modifying, using the one or more processors, the spatial parameters using shift and squeeze parameters;
- obtaining, using the one or more processors, a softmask value for each frequency bin using the modified spatial parameters, the level and subband information; and
- applying, using the one or more processors, the softmask values to the time-frequency tile to generate a modified time-frequency tile of an estimated audio source.

EEE2. The method of EEE 1, wherein a plurality frames of the time-frequency tiles are assembled into a plurality of chunks, each chunk including a plurality of subbands, the method comprising:
- for each subband in each chunk:
- calculating, using the one or more processors, spatial parameters and a level for each time-frequency tile in the chunk;
- modifying, using the one or more processors, the spatial parameters using shift and squeeze parameters;
- obtaining, using the one or more processors, a softmask value for each frequency bin using the modified spatial parameters, the level and subband information; and
  - applying, using the one or more processors, the softmask values to the time-frequency tile to generate a modified time-frequency tile of the estimated audio source.

EEE3. The method of EEE 2, wherein the spatial parameters include panning and phase difference parameters for each of the time-frequency tiles, and calculating shift and squeeze parameters, further comprises:
- for each subband in each chunk:
- creating a smoothed level-parameter-weighted histogram on the panning parameter;
- creating a smoothed, level-parameter-weighted first phase difference histogram on the first phase difference parameter, wherein the first phase difference parameter has a first range;
- creating a smoothed, level-parameter-weighted second phase difference histogram on the second phase difference parameter, wherein the second phase difference parameter has a second range that is different than the first range;
- detecting a panning peak in the smoothed panning histogram;
- determining a panning peak width;
- determining a panning middle value;
- detecting a first phase difference peak in the smoothed, first phase difference histogram;
- determining a first phase difference peak width;
- determining a first phase difference middle value;
- detecting a second phase difference peak in the smoothed, second phase difference histogram;
- determining a second phase difference peak width; and
- determining a second phase difference middle value, wherein the shift parameters include the panning middle value and the first or second phase difference middle value, and the squeeze parameters include the panning peak width and the first or second phase difference peak width.

EEE4. The method of EEE 3, further comprising determining which of the first and second phase difference peak widths is more narrow, wherein the shift parameters include the panning middle value and the first or second phase difference middle value of the more narrow peak, and the squeeze parameters include the panning peak width and the first or second phase difference peak width that is more narrow.

EEE5. The method of any of EEES 1-4, further comprising:
- transforming, using the one or more processors, the modified time-frequency tiles into a plurality of time domain audio source signals.

EEE6. The method of any of EEEs 1-5, wherein the spatial parameters include panning and phase difference for each of the time-frequency tiles.

EEE7. The method of any of EEEs 1-6, wherein the softmask values are obtained from a lookup table or function for a spatio-level filtering (SLF) system trained for a center-panned target source.

EEE8. The method of any of EEEs 1-7, wherein transforming one or more frames of a two-channel time domain audio signal into a frequency domain signal comprises applying a short-time frequency transform (STFT) to the two-channel time domain audio signal.

EEE9. The method of any of EEEs 1-8, wherein multiple frequency bins are grouped into octave subbands or approximately octave subbands.

EEE10. The method of any of EEEs 1-9, wherein the spatial parameters include panning and phase difference parameters for each of the time-frequency tiles, and calculating shift and squeeze parameters, further comprises:

- assembling consecutive frames of the time-frequency tiles into chunks, each chunk including a plurality of subbands;
- for each subband in each chunk:
  - creating a smoothed level-parameter-weighted histogram on the panning parameter;
  - creating a smoothed, level-parameter-weighted first phase difference histogram on the first phase difference parameter, wherein the first phase difference parameter has a first range;
  - creating a smoothed, level-parameter-weighted second phase difference histogram on the second phase difference parameter, wherein the second phase difference parameter has a second range that is different than the first range;
  - detecting a panning peak in the smoothed panning histogram;
  - determining a panning peak width;
  - determining a panning middle value;
  - detecting a first phase difference peak in the smoothed, first phase difference histogram;
  - determining a first phase difference peak width;
  - determining a first phase difference middle value;
  - detecting a second phase difference peak in the smoothed, second phase difference histogram;
  - determining a second phase difference peak width; and
  - determining a second phase difference middle value, wherein the shift parameters include the panning middle value and the first or second phase difference middle value, and the squeeze parameters include the panning peak width and the first or second phase difference peak width.

EEE11. The method of EEE 10, further comprising determining which of the first and second phase difference peak widths is more narrow, wherein the shift parameters include the panning middle value and the first or second phase difference middle value of the more narrow peak, and the squeeze parameters include the panning peak width and the first or second phase difference peak width that is more narrow.

EEE12. The method of EEE 10 or 11, wherein the first range is from $-\pi$ to $\pi$ radians, and the second range is from 0 to $2\pi$ radians.

EEE13. The method of any of EEEs 10-12, wherein the panning histogram and the first and second phase histograms are smoothed over time using panning and phase difference histograms created for previous and subsequent chunks, or weighted data in the previous and subsequent chunks is collected then directly used to form the histograms.

EEE14. The method of any of EEEs 10-13, wherein the panning peak width captures at least forty percent of the total energy in the panning histogram, and the first and second phase difference peak widths each capture at least eighty percent of the total energy in their respective histograms.

EEE15. The method of any of EEEs 10-14, wherein the shift and squeeze parameters for each subband in each chunk are converted to exist for each frame of the one or more frames.

EEE16. The method of any of EEEs 10-15, wherein the panning shift and squeeze parameters are converted to exist for each frame using linear interpolation and the first or second phase difference shift parameter is converted to exist for each frame using a zero order hold.

EEE17. The method of any of EEEs 10-16, further comprising determining a single panning middle value and a single panning peak width value per unit of time for the one or more subbands in the one or more chunks.

EEE18. The method of any of EEEs 10-17, wherein the softmask values are smoothed over time and frequency.

EEE19. An apparatus comprising:

- one or more processors;
- memory storing instructions that when executed by the one or more processors, cause the one or more processors to perform any of the preceding methods EEEs 1-18.

EEE20. A non-transitory, computer readable storage medium having stored thereon instructions, that when executed by one or more processors, cause the one or more processors to perform any of the preceding methods of EEEs 1-18.

The invention claimed is:

1. A method comprising:

transforming, using one or more processors, one or more frames of a two-channel time domain audio signal into a time-frequency domain representation including a plurality of time-frequency tiles, wherein the frequency domain of the time-frequency domain representation includes a plurality of frequency bins grouped into a plurality of subbands;

for each time-frequency tile:

- calculating, using the one or more processors, spatial parameters and a level for the time-frequency tile;
- modifying, using the one or more processors, the spatial parameters using shift and squeeze parameters;
- obtaining, using the one or more processors, a softmask value for each frequency bin using the modified spatial parameters, the level and subband information; and
- applying, using the one or more processors, the softmask values to the time-frequency tile to generate a modified time-frequency tile of an estimated audio source.

2. The method of claim 1, wherein the spatial parameters include panning parameters and phase difference parameters for each of the time-frequency tiles and wherein the method further comprises, for each subband:

- determining a statistical distribution of the panning parameters and a statistical distribution of the phase difference parameters;
- determining the shift parameters as the panning parameter and the phase difference parameter corresponding to a peak value of the respective statistical distributions of the panning parameters and phase difference parameters; and
- determining the squeeze parameters as a width around the peak value of the respective distributions of the panning parameters and phase difference parameters for capturing a predetermined amount of audio energy.

3. The method of claim 2, wherein the predetermined amount of audio energy is at least forty percent of the total energy in the statistical distribution of the panning parameters and at least eighty percent of the total energy in the statistical distribution of the phase difference parameters.

4. The method of claim 2, wherein determining the statistical distribution of the panning parameters further comprises:

creating a smoothed level-parameter-weighted histogram on the panning parameter;

wherein determining the statistical distribution of the phase difference parameters further comprises:

creating a smoothed, level-parameter-weighted first phase difference histogram on the first phase difference parameter, wherein the first phase difference parameter has a first range;

creating a smoothed, level-parameter-weighted second phase difference histogram on the second phase difference parameter, wherein the second phase difference parameter has a second range that is different than the first range;

wherein determining the panning parameter corresponding to the peak value of the statistical distribution of the panning parameters and the width around the peak value of the statistical distribution of the panning parameters further comprises:

detecting a panning peak in the smoothed panning histogram;

determining a panning peak width;

determining a panning middle value; and wherein determining the phase difference parameter corresponding to the peak value of the statistical distribution of the phase difference parameters and the width around the peak value of the statistical distribution of the phase difference parameters further comprises:

detecting a first phase difference peak in the smoothed, first phase difference histogram;

determining a first phase difference peak width;

determining a first phase difference middle value;

detecting a second phase difference peak in the smoothed, second phase difference histogram;

determining a second phase difference peak width; and determining a second phase difference middle value, wherein the shift parameters include the panning middle value and the first or second phase difference middle value, and the squeeze parameters include the panning peak width and the first or second phase difference peak width.

5. The method of claim 4, further comprising determining which of the first and second phase difference peak widths is more narrow, wherein the shift parameters include the panning middle value and the first or second phase difference middle value of the more narrow peak, and the squeeze parameters include the panning peak width and the first or second phase difference peak width that is more narrow.

6. The method of claim 4, wherein transforming one or more frames of a two-channel time domain audio signal into a frequency domain signal comprises applying a short-time frequency transform (STFT) to the two-channel time domain audio signal.

7. The method of claim 6, wherein the first range is from $-\pi$ to $\pi$ radians, and the second range is from 0 to $2\pi$ radians.

8. The method of claim 4 wherein a plurality of frames of the time frequency tiles are assembled into a plurality of chunks, each chunk including a plurality of subbands, and wherein the method is performed for each subband in each chunk.

9. The method of claim 8, wherein the panning histogram and the first and second phase histograms are smoothed over time using panning and phase difference histograms created for previous and subsequent chunks, or weighted data in the previous and subsequent chunks is collected then directly used to form the histograms.

10. The method of claim 8, wherein the shift and squeeze parameters for each subband in each chunk are converted to exist for each frame of the one or more frames.

11. The method of claim 8, further comprising determining a single panning middle value and a single panning peak width value per unit of time for the one or more subbands in the one or more chunks.

12. The method of claim 4, wherein the panning peak width captures at least forty percent of the total energy in the panning histogram, and the first and second phase difference peak widths each capture at least eighty percent of the total energy in their respective histograms.

13. The method of claim 4, wherein the panning shift and squeeze parameters are converted to exist for each frame using linear interpolation and the first or second phase difference shift parameter is converted to exist for each frame using a zero order hold.

14. The method of claim 1, further comprising:

transforming, using the one or more processors, the modified time-frequency tiles into a plurality of time domain audio source signals.

15. The method of claim 1, wherein the softmask values are obtained from a lookup table or function for a spatio-level filtering (SLF) system trained for a center-panned target source.

16. The method of claim 1, wherein multiple frequency bins are grouped into octave subbands or approximately octave subbands.

17. The method of claim 1, wherein the softmask values are smoothed over time and frequency.

18. An apparatus comprising:

one or more processors;

memory storing instructions that when executed by the one or more processors, cause the one or more processors to perform the method of claim 1.

19. A non-transitory, computer readable storage medium having stored thereon instructions, that when executed by one or more processors, cause the one or more processors to perform the method of claim 1.

* * * * *